United States Patent [19]
Ishii

[11] 4,322,791
[45] Mar. 30, 1982

[54] ERROR DISPLAY SYSTEMS

[75] Inventor: Takatoshi Ishii, Ohme, Japan

[73] Assignee: Tokyo Shibaura Electric Co., Ltd., Japan

[21] Appl. No.: 99,745

[22] Filed: Dec. 3, 1979

Related U.S. Application Data

[63] Continuation of Ser. No. 862,901, Dec. 21, 1977, abandoned.

[30] Foreign Application Priority Data

Dec. 23, 1976 [JP] Japan .............................. 51/154178

[51] Int. Cl.³ .............................................. G06F 11/22
[52] U.S. Cl. ..................................... 364/200; 371/29
[58] Field of Search ... 364/200 MS File, 900 MS File; 371/16, 19, 29; 340/52 F, 51 G

[56] References Cited

U.S. PATENT DOCUMENTS

| | | | |
|---|---|---|---|
| 3,415,981 | 12/1968 | Smith et al. ........................... | 371/19 |
| 3,427,443 | 2/1969 | Apple et al. ........................... | 371/19 |
| 3,470,538 | 9/1969 | Harbaugh .............................. | 364/200 |
| 3,517,171 | 6/1970 | Avizienis .............................. | 364/200 |
| 3,602,889 | 8/1971 | Gayman ............................... | 364/200 |
| 3,678,466 | 7/1972 | Spangler .............................. | 364/200 |
| 3,749,897 | 7/1973 | Hirvela ................................ | 371/16 |
| 3,813,531 | 5/1974 | King et al. ........................... | 371/29 |
| 3,949,375 | 4/1976 | Ciarlo .................................. | 364/200 |
| 4,004,283 | 1/1977 | Bennett et al. ....................... | 364/200 |
| 4,030,073 | 6/1977 | Armstrong, Jr. ..................... | 364/200 |
| 4,087,855 | 5/1978 | Bennett et al. ....................... | 364/200 |
| 4,127,768 | 11/1978 | Negi et al. ............................ | 371/16 |

OTHER PUBLICATIONS

IBM Tech. Disc. Bull., "Reliable Error Indication under Programmed Testing", Carusone et al., vol. 23, No. 1, Jun. 80, pp. 105–106.
IBM Tech. Disc. Bull., "System Initialization Check", Bodner et al., vol. 17, No. 7, Dec. 1974, pp. 2107–2108.
Motorola "M6800 Microprocessor Application Manual", 1975, pp. 6-10 to 6-12 and 6-17 to 6-19.
Motorola "M6800 Microcomputer System Design Data", 1976, pp. 2-6, and 12, 39 and 43-48.

Primary Examiner—Harvey E. Springborn
Assistant Examiner—Eddie P. Chan
Attorney, Agent, or Firm—Finnegan, Henderson, Farabow, Garrett & Dunner

[57] ABSTRACT

An error display circuit in a data processing device containing an independent processor circuit is set by an initializing signal generated when a power source is turned on and reset by the operation of the processor circuit when the initializing signal is removed. By this means the fact that the processor circuit can operate normally at a level above a definite degree can be affirmed by the state of the display circuit.

8 Claims, 2 Drawing Figures

ERROR DISPLAY SYSTEMS

This is a continuation of application Ser. No. 862,901, filed Dec. 21, 1977, now abandoned.

BACKGROUND OF THE INVENTION

This invention relates to an error display system of a data processing device containing an independent processor unit such as a micro-processor.

Generally, an error display circuit for use in a data processing device is reset by an initializing signal which is generated when a power supply source is turned on. To detect an error various error detecting means have been used including a parity check circuit or a comparator utilizing a hardware, and contradiction check means for comparison and logic by means of a firmware or software. Where occurrence of an error is detected by the error detecting means, such detection will cause an error retry sequence or an error display indicator on the maintenance panel to be turned on to report the occurrence of the error to an operator.

Where another error occurs during an interval between the error detection and display thereof by the error display circuit such error would be overlooked without being displayed. To prevent this it is necessary to always confirm the error of the data processing device by periodic preventive maintenance. More preferably, error confirmation should be automatically made at the time of turning on the source. Such confirmation can be advantageously performed by storing a test program in a read only memory (ROM) thereby executing the test program at the time of turning on the source. However, in a system wherein an independent processor such as a micro-processor is contained in a data processing device, the error which is detected by the independent processor through a program is displayed by the program. Where the processor correctly executes its normal operation and an error at an external circuit is detected there is no contradiction in its processing operation but where there is a single defect in the processor itself the following problem occurs.

More particularly, although the operating states of the processor differ variously due to the location of the defect, such states are generally classified into the following two cases. In one case, only one of the instructions of the processor becomes impossible to execute, while in the other case all functions become impossible to execute. In the latter case, even when the test program of a ROM is executed the error would not be displayed since normal operation is necessary to display the error, thus causing a failure to display the defect of the processor. In other words, in spite of the fact that the processor involves a single defect, the data processing device would be used without correcting the defect because the error display circuit displays only under normal operating condition.

SUMMARY OF THE INVENTION

Accordingly, it is an object of this invention to provide an error display system for a data processing device containing a processor unit, which can display the fault of the processor unit itself.

According to this invention, there is provided an error display system comprising a processor unit, a memory unit whose memory content is selectively read by the processor unit, an indicator register allocated to an address of the processor unit, and a check indicator which displays an output of the indicator register.

More particularly, the error display circuit of a data processing device containing an independent processor is set by an initializing signal which persists for a relatively long time, for example, several hundred milliseconds, generated when the power source is turned on, and reset by the operation of the processor which occurs after the termination of the initializing signal. Thus, the fact that the processor unit can operate normally at a level above a definite degree can be affirmed by the state of the error display circuit.

BRIEF DESCRIPTION OF THE DRAWINGS

In the accompanying drawings.

DETAILED DESCRIPTION OF THE PREFERRED EMBODIMENTS

Figure 1:
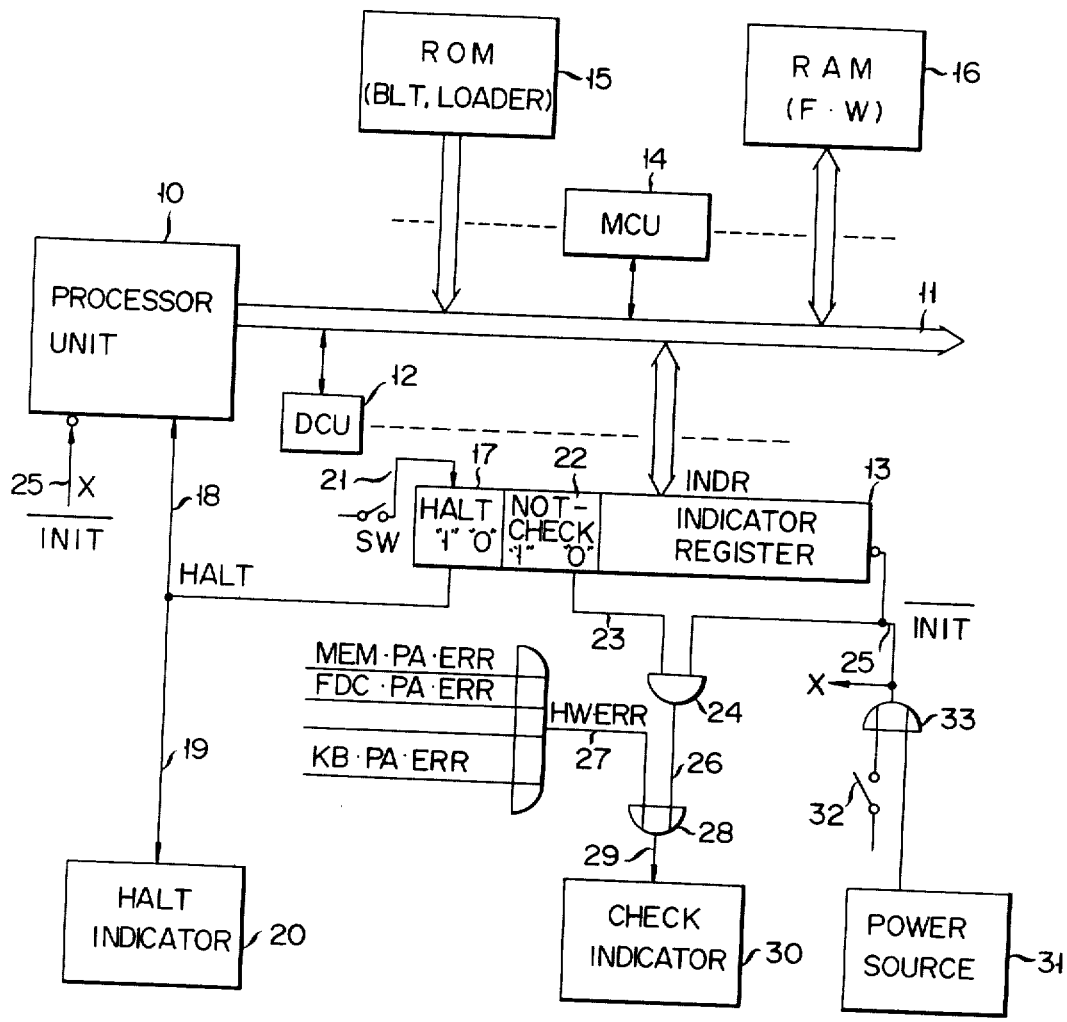
FIG. 1 is a block diagram showing one example of an error display system embodying the invention.

In a preferred embodiment of this invention shown in FIG. 1, a processor unit (PU) 10 is an independent unit contained in a data processing device and comprises a microprocessor, for example. The processor unit 10 is coupled with a device controller unit (DCU) 12, an indicator register (INDR) 13, a memory control unit (MCU) 14, a ROM 15 and a random access memory (RAM) 16 via a main bus line 11. The device control unit 12 controls registers via the main bus line, and the indicator register 13 is one of the registers controlled by the device controller unit 12 and allocated to a given address by the device controller unit 12. The purpose of the memory control unit 14 is to control such memories as ROM 15 and RAM 16. In the ROM 15 are stored a basic logic test (BLT) program and a loader (LOADER) program which are executed when an initializing signal (INIT) which is generated at the time of turning on the source is applied, whereas RAM 16 stores a firmware (FW) loaded by the loader. Under the control of the memory control unit 14, ROM 15 and RAM 16 are allocated with independent addresses when viewed from processor 10. The initializing signal INIT is applied to the reset terminals of the processor unit 10 and the indicator register 13 so as to clear and return them to the initial state.

Turning now to the display circuit, various display information is transferred to and stored in the indicator register 13 through main bus line 11 but only two bits related to the invention will be described herein. One bit comprises a halt bit 17 which is acted on by the program. This bit sends a halt signal to the processor 10 via line 18 and to a halt indicator 20 via line 19. Also the halt bit 17 is set and reset by an external signal 21 applied through an input switch SW so as to control RUN/HALT states of the processor 10.

The other bit comprises a not-check bit 22 which is provided for the purpose of displaying an error state and constructed to display error when reset by the program. More particularly, a logical product output 26 of the reset side output "0" 23 of the not-check bit 22 and the inverted initializing signal INIT 25 is produced by an AND gate circuit 24 and the output 26 thereof is applied to the inputs of an OR gate circuit 28 together with a hardware error signal 27. Hardware error signal 27 is detected by the other hardware and comprises, for example, a memory parity error (MEM·PA·ERR) sent from the memory control unit 14, a parity error FDC·PA·ERR) sent from a floppy disk control and a parity error (KB·PA·ERR) sent from a key board. The output 29 of OR gate circuit 28 is sent to a check indicator 30 to display error. The initializing signal INIT may be produced by supplying either a source signal from power source 31 or the output of an initializing signal generating switch 32 through an OR gate circuit 33.

The error display system described above operates as follows. When an initializing signal INIT(=0) 25 which is generated by the turning on of power source 31 or by the closure of initializing signal generating switch 32, the processor unit 10 and the indicator register 13 are reset so that the halt bit 17 and the not-check bit 22 become "0" and "0" respectively, that is HALT and NOT-CHECK. This means that the halt bit 17 and the not-check bit 22 are "1" in the RUN and CHECK conditions wherein the signal 23 is maintained at "1" respectively. Under these status when INIT signal is terminated; signal 25 becomes "1" whereby AND gate circuit 24 produces a logical product output 26 which is sent to the check indicator 30 via OR gate circuit 28 thus turning on the check indicator 30.

When initialized by the initializing signal INIT(=0) 25 the processor 10 begins to execute the test program in response to a start address of the basic logic test (BLT) program contained in the ROM 15. In the first address of the basic logic test (BLT) program is stored a set instruction of the not-check bit 22. Thus, it is programmed that a binary code "01000000", for example, is to be written in an address of indicator register 13. The not-check bit 22 is set by this binary code to disable the AND gate circuit 24 thus turning off the check indicator 30.

Figure 2:
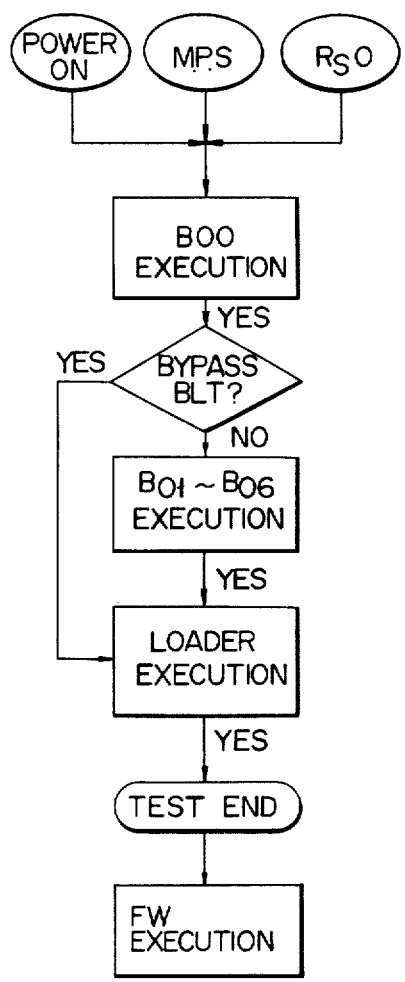
FIG. 2 is a flow chart showing a basic logic test (BLT) routine.

The routine of the basic logic test (BLT) program will now be described in detail with reference to the flow chart shown in FIG. 2. When a POWER ON signal, a MPS (maintenance panel switch) signal and an RSO (reset out) signal are generated, the numbers of the test program are set in the indicator of the maintenance panel (MP), thus executing a TEST B00 which is the first number of the test program. The contents of the test number B00 are:

1. To set the test program number in the indicator of the maintenance panel MP (for example, to set X"B00" in address FFE).
2. To verify the result of processing of the device control unit 12 by the processor unit 10.
3. To verify the result of processing of the ROM 15 by the processor unit 10.
4. To set halt bit 17 when an error occurs at steps 2 and 3.

If the result of TEST B00 was error free, whether the execution of the BLT (basic logic test) is to be bypassed or not would be judged at the next step. If the result is YES a LOAD step would be executed, whereas if the result was an error, TESTs B01–B06 of BLT would be executed. The contents of these TESTs B01–B06 are as follows:

B01: Respective instructions (LOAD, SWAP, AND, OR, ADD, SUBTRACT, MULTIPLY, DIVIDE, STORE, COMPARE) of the micro-processor 10 are executed.
B02: Respective instructions (BRANCH ON CONDITION, SET/CLEARED, INCREMENT/DECREMENT, ROTATE LEFT/RIGHT, TEST OR OPERATE, SET A BIT, INVERT A BIT, TEST A BIT) are checked.
B03: The memory control unit MCU 14 is tested.
B04: The device control unit 12 is tested.
B05: The device interface adaptor DIA is tested.
B06: The floppy disk control adaptor FDCA is tested.

When the results of all of tests of B01 through B06 are error free, a LOADER is executed, and if the result of LOADER is YES, a TEST END is reached, and a program (firmware) loaded by the LOADER is executed.

When an error is detected by the other error detection hardware while the basic logic test (BLT) of the ROM 15 or the firmware (FW) of the RAM is being executed, the halt bit 17 is set by a WRITE-instruction from the processor unit 10 and the not-check bit 22 is reset. More particularly, the program is prepared such that a binary code 10000000, for example, is written in an address of the indicator register 22. In response to this binary value the processor 10 is halted and the halt indicator 20 and the check indicator 30 are turned ON. If there is a single defect of some sort in the processor unit 10 and such defect occurs in a hardware element which renders impossible the execution of all functions of the processor unit 10 it is impossible to set the not-check bit 22 at the time of firstly executing the basic logic test BLT. Accordingly, even in the RUN state, since the check indicator 30 is maintained in a turn ON state, the fault of the processor unit 10 can be immediately recognized by the operator.

In order to set the not-check bit 22 in the early stage of the basic logic test (BLT) the processor unit 10 should have at least a function of executing the program for writing a binary code 0100000 in an address of the indicator register 13. In this embodiment, since the check indicator 30 is turned OFF it is possible to test this basic function (BLT).

The purpose of the AND gate circuit 24 is to prevent unnecessary energization of the check indicator 30 when an initializing signal is present. In other words, since the initializing signal INIT usually persists for a relatively long time, for example, several hundred milliseconds, the AND gate circuit is provided for preventing useless energization of the check indicator during this interval. This is also necessary to prevent the operator from misjudging an initializing stage energization as a fault. Consequently, the check indicator 30 would be energized when the INIT signal is released, but since the operating time of the processor unit 10 is relatively short, of on the order of from several to several tens of microseconds, so long as the processor unit 10 is normal, the AND gate circuit 24 would become disabled before the operator recognizes the energization of the check indicator 30.

As above described, according to this invention, the error display circuit is first set by the initializing signal and reset by the program firstly executed by the processor so that the processor itself can control the error display by confirming this operation by the program. Accordingly, the operator can note that the processor is inoperative unless the error display circuit is reset where the processor can operate normally to some extent.

What is claimed is:

1. An error display system for displaying an error state in a data processing system comprising:
   means for generating an initializing signal in response to the activation of said data processing system, said initializing signal being set to a first signal value for a first time period and then to a second signal value for a second time period;

a read-only memory for storing a basic logic test program;

an indicator register including a not-check bit having a first value or a second value, said not-check bit being set to said first value in response to said initializing signal having said first signal value;

an error condition indicator;

gating means connected to said error condition indicator, said indicator register, and said generating means, said gating means for controlling said indicator to indicate an error condition in response to the simultaneous occurrence of said first signal value of said initializing signal and said first value of said not-check bit; and a processor unit for accessing and for executing said basic logic test program stored in said read-only memory in response to said first signal value of said initializing signal and for setting said not-check bit in said indicator register to said second value upon the successful execution of said basic logic test program to thereby extinguish said error condition indicator.

2. The error display system according to claim 1, wherein said processor unit comprises a micro-processor.

3. The error display system according to claim 1 further including a halt indicator, wherein said processor unit includes hardware elements and said indicator register includes a halt bit for halting said processor unit and for driving a halt indicator indicating a halt of one of said hardware elements.

4. The error display system according to claim 3, which further comprises a switch to externally set and reset said halt bit, a halt indicator, and means for applying a halt signal produced by said halt bit to said processor unit and said halt indicator.

5. The error display system according to claim 4, wherein said gating means comprises an AND gate circuit having inputs connected to receive a reset output of said not-check bit and said initializing signal, and means for applying the output of said AND gate circuit to said error condition indicator.

6. The error display system according to claim 5, which further comprises an OR gate circuit having a plurality of inputs supplied with a plurality of hardware error signals, and the output of said AND gate circuit, and an output connected to the input of said error condition indicator.

7. The error display system according to claim 1 having firmware externally supplied thereto and further including a random-access memory, wherein said read-only memory further stores a loader program for controlling said data processing system to load the externally supplied firmware into said random-access memory and further wherein said processor unit accesses and executes said loader program only after said basic test program has been executed and no errors have been detected in said data processing system.

8. The error display system of claim 1 wherein said error condition indicator is inhibited from indicating an error status when said initializing signal has said first signal value in the absence of said first value of said not-check bit.

* * * * *